(12) United States Patent
Ashton et al.

(10) Patent No.: US 7,558,914 B2
(45) Date of Patent: Jul. 7, 2009

(54) DATA OBJECT PROCESSING OF STORAGE DRIVE BUFFERS

(75) Inventors: Lyn L. Ashton, Tucson, AZ (US);
Edward A. Baker, Jr., Tucson, AZ (US);
Stanley M. Kissinger, Tucson, AZ (US);
William McEwen, Oro Valley, AZ (US);
Sean P. McMillen, Tucson, AZ (US);
Michael R. Noel, Tucson, AZ (US);
Glenn R. Wilcock, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 11/534,543

(22) Filed: Sep. 22, 2006

(65) Prior Publication Data

US 2008/0077742 A1 Mar. 27, 2008

(51) Int. Cl.
*G06F 12/12* (2006.01)
(52) U.S. Cl. ........................................ 711/113; 711/135
(58) Field of Classification Search ........................ None
See application file for complete search history.

(56) References Cited

U.S. PATENT DOCUMENTS

| | | | |
|---|---|---|---|
| 5,768,548 A * | 6/1998 | Young et al. | 710/306 |
| 6,226,761 B1 | 5/2001 | Berstis | |
| 6,412,045 B1 | 6/2002 | DeKoning et al. | |
| 6,542,512 B1 | 4/2003 | Fischer et al. | |
| 6,829,688 B2 | 12/2004 | Grubbs et al. | |
| 6,892,244 B2 | 5/2005 | De Roose | |
| 2004/0172513 A1 | 9/2004 | Nelson | |
| 2004/0221120 A1 | 11/2004 | Abrashkevich et al. | |
| 2005/0005087 A1 | 1/2005 | Yang | |
| 2005/0240649 A1 * | 10/2005 | Elkington et al. | 709/200 |
| 2007/0168626 A1 * | 7/2007 | De Souza | 711/159 |

* cited by examiner

*Primary Examiner*—Kevin Verbrugge
(74) *Attorney, Agent, or Firm*—Rabindranath Dutta; Konrad Raynes & Victor LLP

(57) ABSTRACT

A deterministic flushing of one or more storage data objects buffered within a storage data buffer to a storage medium involves a processing of a host data object including writing a storage data object corresponding to the host data object to the storage data buffer, and a flushing of the storage data object(s) buffered within the storage data buffer to the storage medium prior to or subsequent to (i.e., relative to) the writing of the storage data object corresponding to the host data object to the storage data buffer as a function of an occurrence determination of a storage data buffer flushing event. The deterministic flushing further involves a queuing of a host data buffer meta-data update request for later processing.

21 Claims, 5 Drawing Sheets

DATA OBJECT PROCESSING OF STORAGE DRIVE BUFFERS

FIELD OF THE INVENTION

The present invention generally relates to the flushing of storage data objects buffered within a storage data buffer to a storage medium. The present invention specifically relates to a deterministic approach as to when the buffered storage data objects are flushed from the storage data buffer to the storage medium.

BACKGROUND OF THE INVENTION

FIG. 1 illustrates a buffering of a host data object ("HDO") within a host data buffer 11 of a host 10 for purposes of being individually processed for storage as storage data object ("SDO") (i.e., a processed version of host data object HDO) in a storage medium 40. The processing by host 10 of host data object HDO includes a writing of its corresponding storage data object SDO to a storage data buffer 21 of a storage control unit 20. Generally, to provide data integrity and to ensure storage data object SDO being written to storage data buffer 21 is successfully written by a storage drive 30 to storage medium 40, storage data object SDO buffered in storage data buffer 21 is flushed by host 10, synchronously or periodically, to storage device 30 for storage within storage medium 40. Ensuring buffered storage data object SDO is indeed "hardened" to storage medium 40 mitigates a degree of recovery needed due to a loss of buffered storage data object SDO as a result of an abnormal storage system termination or other storage system error event.

Specifically, some existing flushing techniques involve host 10 synchronously flushing storage data buffer 21 upon a processing completion of host data object HDO, while other existing flushing techniques involve a periodic flushing of storage data buffer 21 by host 10 on a regular basis irrespective of processing of host data object HDO. However, the synchronous or periodic flushing of storage data buffer 21 by host 10 along with a synchronous updating of meta-data associated with a processed host data object HDO interrupts the flow of data to storage medium 40 as well as adds overhead processing. Thus, storage data buffer flushing and meta-data updating, while necessary, interfere with data streaming capabilities of data to storage medium 40. A solution is therefore needed to provide sparser, yet predetermined buffer flushing intervals of storage data buffer 21 to thereby improve upon a storage system throughput and performance while providing a limit on how much recovery must be performed in view of an unsuccessful hardening of storage data object SDO within storage medium 40. Additionally, a solution is needed to eliminate any interference to the flow of data to storage medium 40 by meta-data updates.

SUMMARY OF THE INVENTION

The present invention provides a new and unique deterministic approach as to when storage data objects are flushed from a storage data buffer to a storage medium.

One form of the present invention is a computer readable medium tangibly embodying a program of machine-readable instructions executable by a processor to perform operations for deterministically flushing one or more storage data objects buffered within a storage data buffer to a storage medium. The operations comprise a processing of a host data object including writing a storage data object corresponding to the host data object to the storage data buffer, and a flushing of the storage data object(s) buffered within the storage data buffer to the storage medium prior to or subsequent to (i.e., relative to) the writing of the storage data object corresponding to the host data object to the storage data buffer as a function of an occurrence determination of a storage data buffer flushing event.

A second form of the present invention is a storage device comprising a processor, and a memory storing instructions operable with the processor for deterministically flushing one or more storage data objects buffered within a storage data buffer to a storage medium. The instructions are executed for a processing of a host data object including writing a storage data object corresponding to the host data object to the storage data buffer, and for a flushing of the storage data object(s) buffered within the storage data buffer to the storage medium prior to or subsequent to (i.e., relative to) the writing of the storage data object corresponding to the host data object to the storage data buffer as a function of an occurrence determination of a storage data buffer flushing event.

A third form of the present invention is a method for deterministically flushing one or more storage data objects buffered within a storage data buffer to a storage medium. The method comprises a processing of a host data object including writing a storage data object corresponding to the host data object to the storage data buffer, and a flushing of the storage data object(s) buffered within the storage data buffer to the storage medium prior to or subsequent to (i.e., relative to) the writing of the storage data object corresponding to the host data object to the storage data buffer as a function of an occurrence determination of a storage data buffer flushing event.

The aforementioned forms and additional forms as well as objects and advantages of the present invention will become further apparent from the following detailed description of the various embodiments of the present invention read in conjunction with the accompanying drawings. The detailed description of the drawings are merely illustrative of the present invention rather than limiting, the scope of the present invention being defined by the appended claims and equivalents thereof.

DETAILED DESCRIPTION OF THE PRESENT INVENTION

Figure 1:
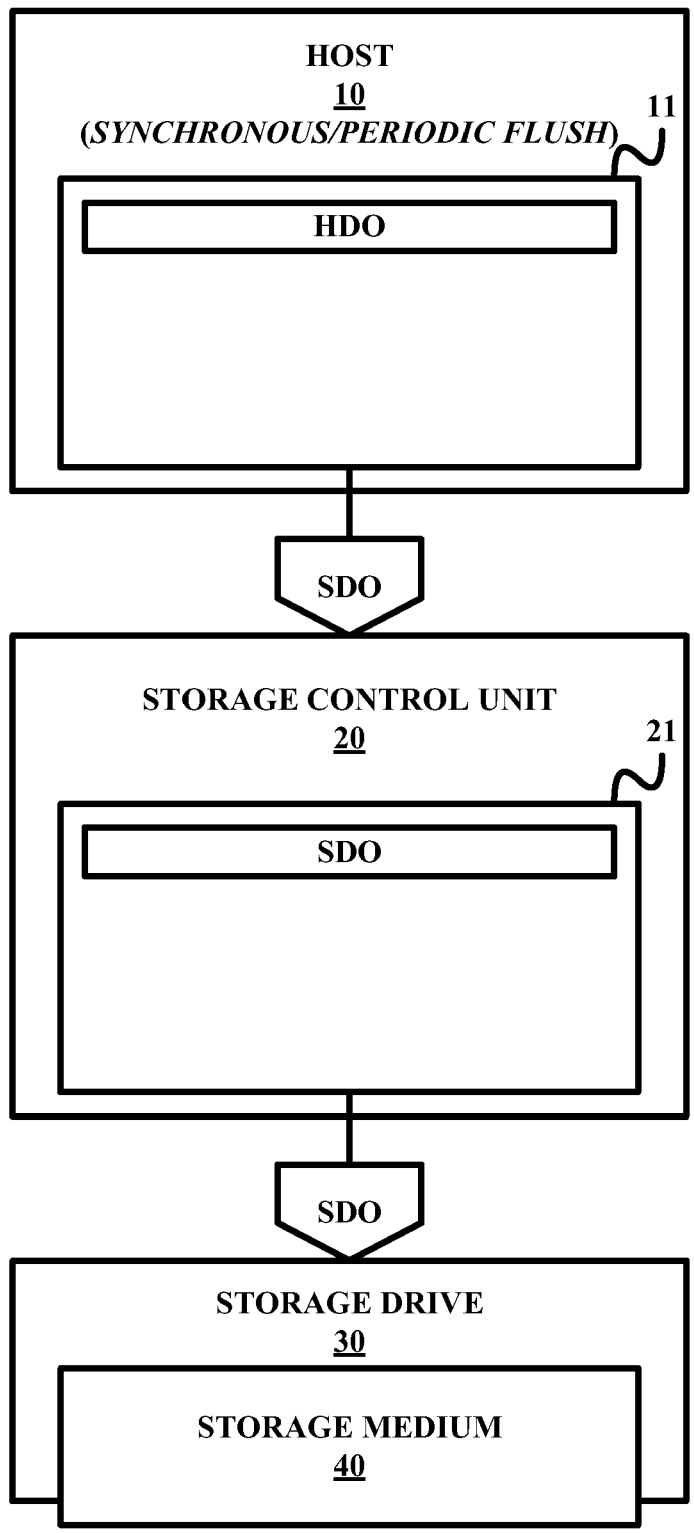
FIG. 1 illustrates a flushing of storage data objects buffered within a storage data buffer to a storage medium as known in the art.
Figure 2:
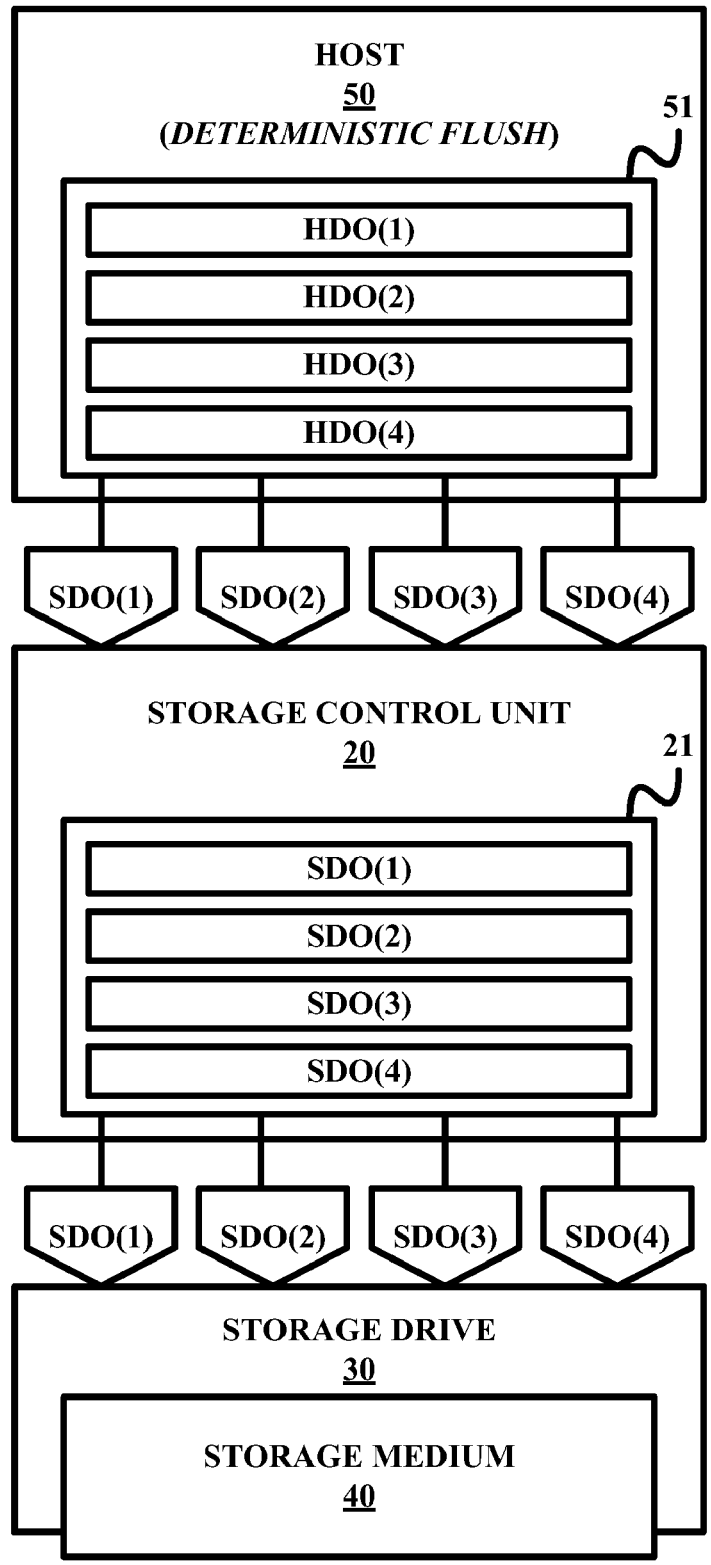
FIG. 2 illustrates a flushing of storage data objects buffered within a storage data buffer to a storage medium in accordance with the present invention.

FIG. 2 illustrates a host 50 constructed under the inventive principles of the present invention to perform a deterministic flushing of storage data objects SDO buffered within storage data buffer 21 to storage medium 40 via storage drive 30. Under the inventive principles of the present invention, host 50 determines an occurrence of a storage data buffer flushing event as a basis for flushing storage data objects SDO buffered within storage data buffer 21 to storage medium 40. For purposes of the present invention, the term "storage data buffer flushing event" is broadly defined herein as any sparse, infrequent or irregular event associated with one or more aspects of processing host data objects HDO for storage as storage data objects SDO within storage medium 40.

One form of storage data buffer flushing events are events related, directly or indirectly, to one or more buffer flushing parameters, such as, for example, a storage data object quantity threshold indicative of a quantity trigger for flushing storage data buffer 21 or a buffered byte quantity threshold indicative of another quantity trigger for flushing storage data buffer 21. Another form of storage data buffer flushing events are events related, directly or indirectly, to an operational status of host 50, storage drive control unit 20, storage drive 30 and/or storage medium 40, such as for example, a volume end event of storage medium 40 or a data object processing error event indicative of an occurrence of specific error conditions.

Figure 3:
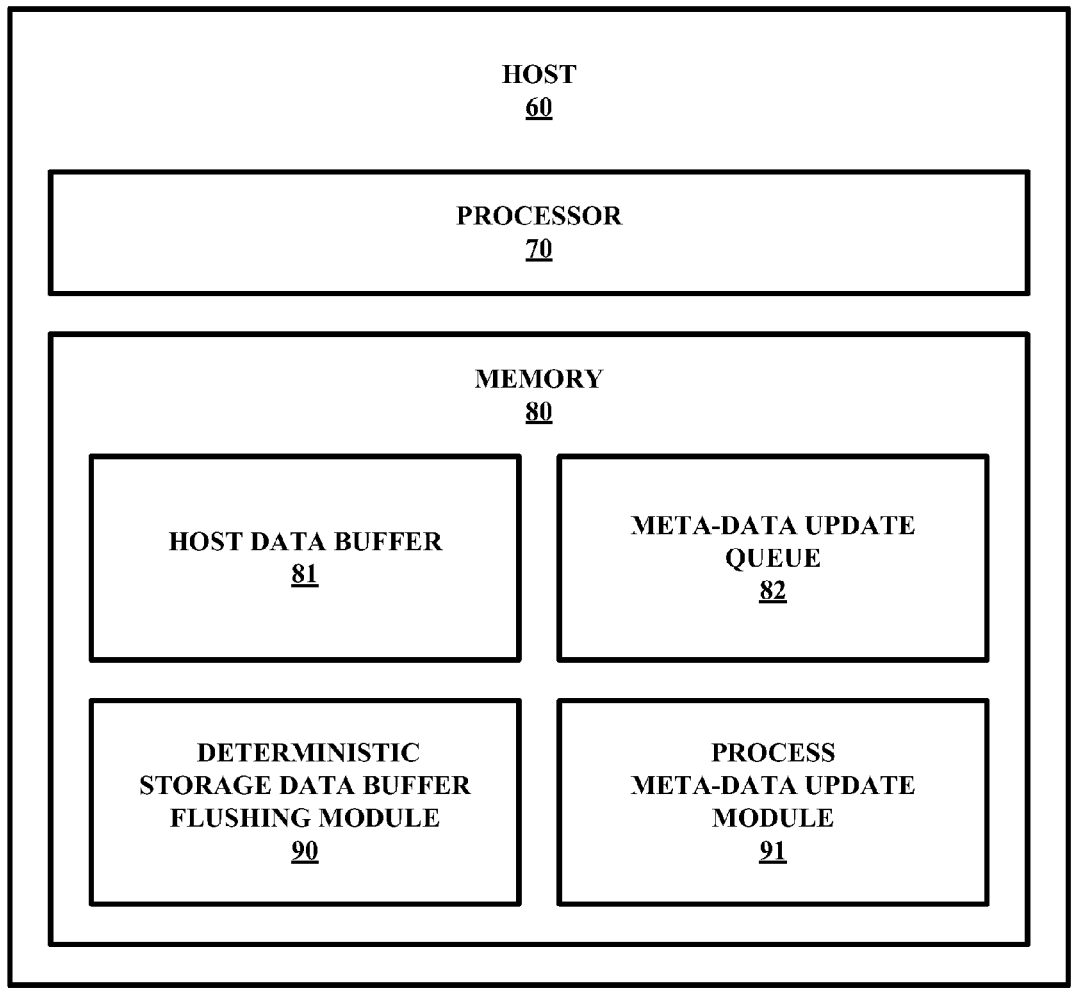
FIG. 3 illustrates one embodiment of a host in accordance with the present invention.
Figure 4:
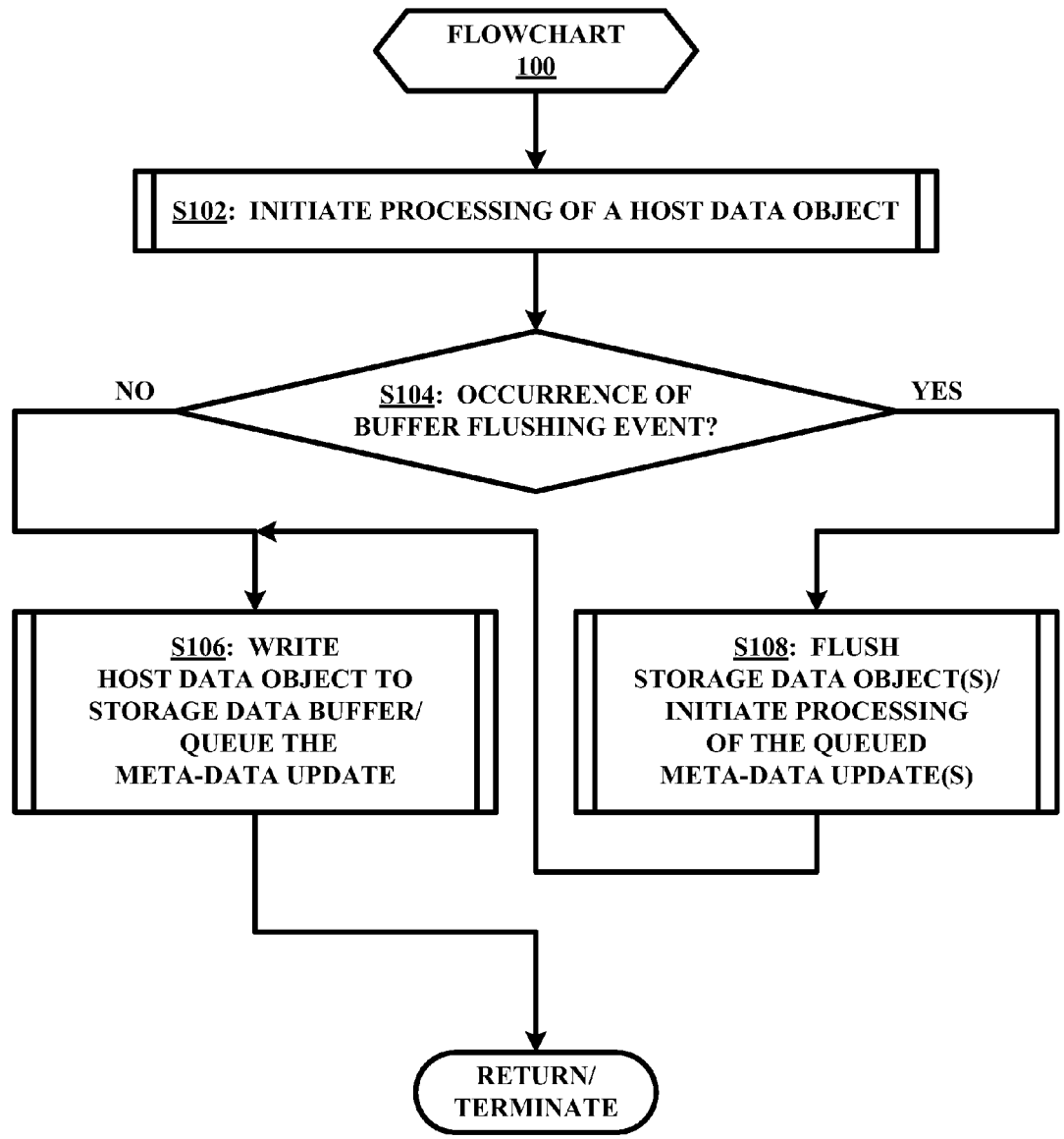
FIG. 4 illustrates a flowchart representative of one embodiment of a deterministic buffer flushing method in accordance with the present invention.

To further understand the inventive principles of the present invention, FIG. 3 illustrates an exemplary embodiment 60 of host 50 (FIG. 2) employing a processor 70 and a memory 80 whereby memory 80 contains a host data buffer 81 for buffering host data objects HDO (FIG. 2) and a meta-data update queue 82 for queuing meta-data updates associated with host data objects HDO. Memory 80 further contains instructions operable by processor 70 in accordance with the present invention for performing a deterministic flushing of storage data objects SDO (FIG. 2) from storage data buffer 21 to storage medium 40 via storage drive 30 and for processing queued meta-data updates. Specifically, a deterministic storage data buffer flushing module 90 and a process meta-data update module 91 are a set of instructions for performing a deterministic buffer flushing method in accordance with the present invention as represented by a flowchart 100 illustrated in FIG. 4.

Specifically, a stage S102 of flowchart 100 encompasses host 60 initiating a processing of a host data object HDO buffered in host data buffer 81 as known in the art whereby the processing of the host data object HDO includes writing a storage data object SDO corresponding to host data object HDO to storage data buffer 21. As part of processing host data object HDO, host 60 determines whether a storage data buffer flushing event has occurred for purposes of determining whether to flush storage data objects SDO buffered within storage data buffer 21 prior to or subsequent to (i.e., relative to) writing the storage data object SDO corresponding to the host data object HDO to the storage data buffer 21. In one exemplary embodiment, host 60 determines an occurrence of a storage data buffer flushing event upon a quantity of storage data objects SDO buffered within storage data buffer 21 equaling a storage data object quantity threshold (i.e., a predetermined quantity of storage data objects SDO stored within storage data buffer 21 for triggering a flushing of storage data buffer 21). In another exemplary embodiment, host 60 determines an occurrence of a storage data buffer flushing event upon a buffered data byte quantity exceeding a buffered data byte quantity threshold (i.e., a predetermined number of cumulative megabytes of storage data objects SDO buffered by storage data buffer 21 for triggering a flushing of storage data buffer 21).

The determination outcome of stage S104 is essential for host 60 in commanding whether the next flushing of storage data buffer 21 is inclusive of or exclusive of the storage object data SDO corresponding to the host data object HDO of stage S102. For example, as shown in FIG. 2, in view of a buffering of storage data object SDO1 having one megabyte of data and a storage data object SDO2 having two megabytes of data within storage data buffer 21 and a host data object HDO3 having three megabytes of data being selected for processing during stage S102, a storage data object SDO3 corresponding to host data object HDO3 will be written to storage data buffer 21 during a stage S106 of flowchart 100 prior to a flushing of storage data objects SDO1 and SDO2 buffered within storage data buffer 21 to storage medium 40 if host 60 determines a storage data buffer flushing event has not occurred during stage S104. The occurrence determination of stage S104 may involve a storage data object quantity threshold being four storage data objects SDO in view of two storage data objects SDO1 and SDO2 and/or a buffered data byte quantity threshold being five megabytes in view of three megabytes of storage data objects SDO1 and SDO2. As a result, storage data object SDO3 will be included with storage data objects SDO1 and SDO2 during the next future deterministic flushing of storage data buffer 21.

Conversely, storage data objects SDO1 and SDO2 will be flushed from storage data buffer 21 to storage medium 40 during a stage S108 of flowchart 100 prior to storage data object SDO3 being written to storage data buffer 21 during stage S106 if host 60 determines a storage data buffer flushing event occurred during stage S 104. The occurrence determination of stage S104 may involve the storage data object quantity threshold being two data objects in view of two storage data objects SDO1 and SDO2 and/or the buffered data byte quantity threshold being three megabytes in view of three megabytes of storage data objects SDO1 and SDO2 to storage medium 40.

By further example, assume a storage data buffer flushing event did not occur during S104 as related to the processing of host data object HDO3. In view of a buffering of storage data objects SDO1, SDO2 and SDO3 within storage data buffer 21 and a host data object HDO4 of four megabytes being selected for processing during stage S102, storage data object SDO4 corresponding to host data object HDO4 will be written to storage data buffer 21 during stage S106 prior to buffered storage data objects SDO1-SDO3 being flushed from storage data buffer 21 to storage medium 40 if host 60 determines a storage data buffer flushing event has not occurred during stage S104. The occurrence determination of stage S104 may involve a storage data object quantity threshold being four data objects in view of three storage data objects SDO1-SDO3 and/or a buffered data byte quantity threshold being ten megabytes in view of six megabytes of storage data objects SDO1-SDO3. As a result, storage data object SDO4 will be included with storage data objects SDO1-SDO3 during the next future deterministic flushing of storage data buffer 21 to storage medium 40.

Conversely, storage data objects SDO1-SDO3 will be flushed from storage data buffer 21 to storage medium 40 during stage S108 prior to storage data object SDO4 being written to storage data buffer 21 during stage S106 if host 60 determines a storage data buffer flushing event occurred during stage S104. The occurrence determination of stage S104 may involve a storage data object quantity threshold being three data objects in view of three storage data objects SDO1-SDO3 and/or a buffered data byte quantity threshold being six megabytes in view of six megabytes of storage data objects SDO1-SDO3.

Of additional importance is an asynchronous updating of meta-data associated with each host data object HDO selected for processing during stage S102. Specifically, host 60 will queue a meta-data update of a processed host data object in queue 82 in accordance with stage S106 for each determination during stage S104 that a storage data buffer flushing event has not occurred and will initiate a processing of all queued meta-data updates during stage S108 only upon a determination during stage S104 that a storage data buffer flushing event has occurred. Those having ordinary skill in the art will appreciate that this queuing and asynchronous processing of meta-data updates until an occurrence of a storage data buffer flushing event enhances the flushing productivity of host 50.

In practice, the present invention does not impose any limitations or any restrictions to the manner by which flowchart 100 is implemented. Thus, the following description of an exemplary embodiment of flowchart 100 as illustrated in FIG. 5 does not impose any limitations or any restrictions to the manner by which flowchart 100 is implemented in practice.

Figure 5:
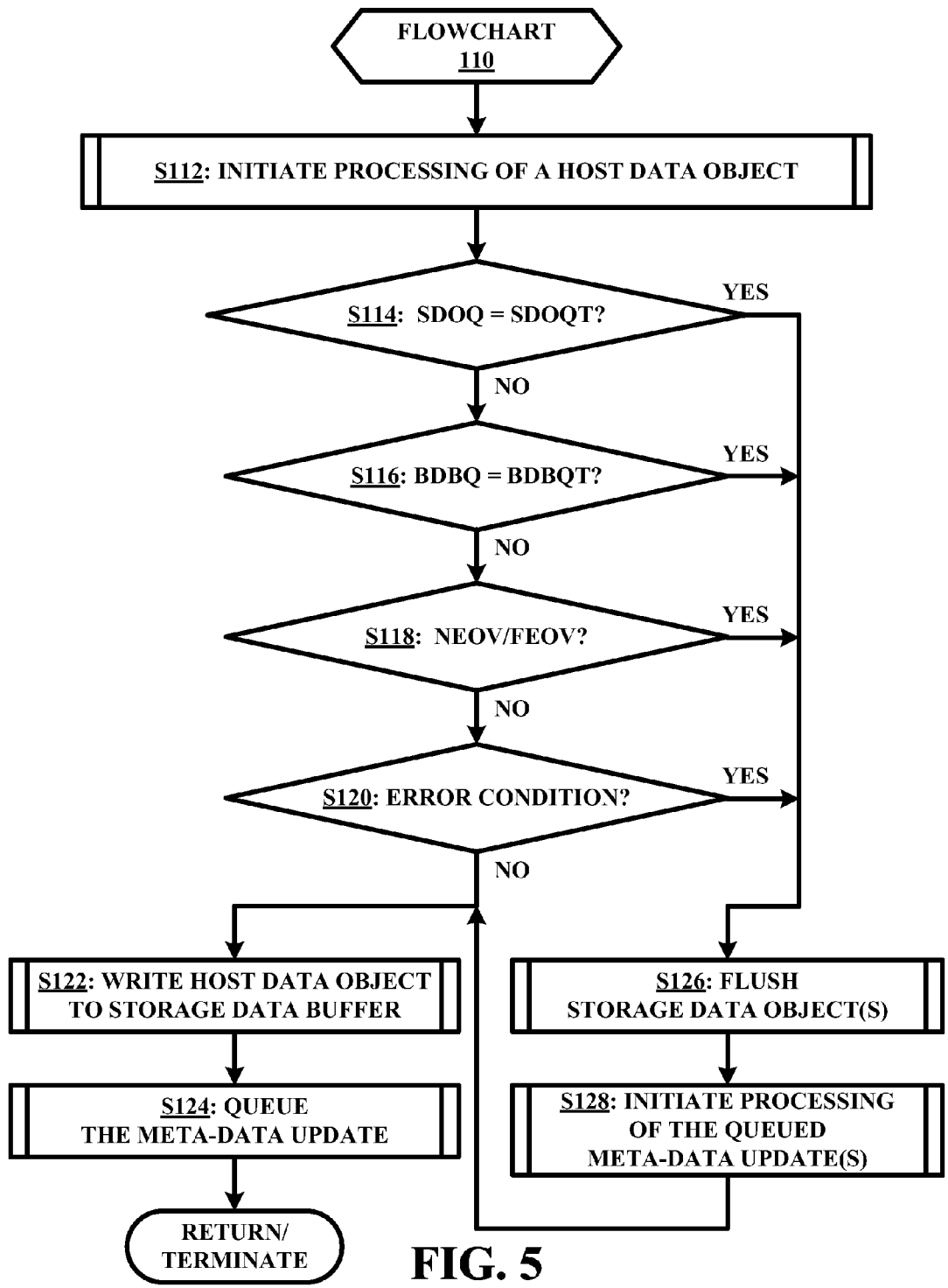
FIG. 5 illustrates a flowchart representative of one embodiment of the deterministic buffer flushing method illustrated in FIG. 4 in accordance with the present invention.

Referring to FIG. 5, flowchart 110 will be described in the context of a buffering within storage data buffer 21 of storage data object SDO1 having one megabyte of data and storage data object SDO2 having two megabytes, the meta-data of storage data objects SDO1 and SDO2 being queued within queue 82, and a host data object HDO3 having three megabytes of data being selected for processing during a stage S112 of flowchart 110. A stage S114 of flowchart 110 encompasses host 60 determining if a storage data object quantity ("SDOQ") equals a storage data object quantity threshold ("SDOQT"). If so, then host 60 sequentially proceeds to a stage S126 of flowchart 110 to flush storage data objects SDO1 and SDO2 buffered within storage data buffer 21 to storage medium 40, a stage S128 of flowchart 110 to initiate a processing of the queued meta-data updates associated with host data objects HDO1 and HDO2, a stage S122 of flowchart 110 to write storage data object SDO3 to flushed storage data buffer 21 and a stage S124 of flowchart 110 to queue the meta-data update associated with host data object HDO3.

Otherwise, host 60 proceeds to a stage S116 of flowchart 110 to determine if a buffered data byte quantity ("BDBQ") exceeds a buffered data byte quantity threshold ("BDBQT"). If so, then host 60 sequentially proceeds to stage S126 to flush storage data objects SDO1 and SDO2 buffered within storage data buffer 21 to storage medium 40, stage S128 to initiate a processing of the queued meta-data updates associated with host data objects HDO1 and HDO2, stage S122 to write storage data object SDO3 to flushed storage data buffer 21 and stage S124 to queue the meta-data update associated with host data object HDO3.

Otherwise, host 60 proceeds to a stage S118 of flowchart 110 to detect if a natural end of volume ("NEOV") event of storage medium 40 or a forced end of volume ("FEOV") event of storage medium 40 has occurred. If so, then host 60 sequentially proceeds to stage S126 to flush storage data objects SDO1 and SDO2 buffered within storage data buffer 21 to storage medium 40, stage S128 to initiate a processing of the queued meta-data updates associated with host data objects HDO 1 and HDO2, stage S122 to write storage data object SDO3 to flushed storage data buffer 21 and stage S124 to queue the meta-data update associated with host data object HDO3.

Otherwise, host 60 proceeds to a stage S120 of flowchart 110 to detect if a system error condition has occurred. If so, then host 60 sequentially proceeds to stage S126 to flush storage data objects SDO1 and SDO2 buffered within storage data buffer 21 to storage medium 40, stage S128 to initiate a processing of the queued meta-data updates associated with host data objects HDO1 and HDO2, stage S122 to write storage data object SDO3 to flushed storage data buffer 21 and stage S124 to queue the meta-data update associated with host data object HDO3.

Otherwise, host 60 sequentially proceeds to stage S122 to write storage data object SDO3 to unflushed storage data buffer 21 and stage S124 to queue the meta-data update associated with host data object HDO3. As such, upon the next future flushing of storage data buffer 21 during stage S126, storage data object SDO3 will be flushed with storage data objects SDO1 and SDO2 along with any other additional storage data objects written to storage data buffer 21 prior to such a flushing of storage data buffer 21. Furthermore, the queued meta-data update associated with host data object HDO3 will be processed with queued meta-data updates associated with host data objects HDO1 and HDO2 along with any other queued meta-data updates prior to such a flushing of storage data buffer 21.

Referring to FIGS. 2-5, those having ordinary skill in the art will appreciate various benefits and advantages of the present invention, including, but not limited to, an uncomplicated technique for flushing a storage data buffer at sparse yet predetermined intervals that improve throughput and performance of a storage system while limiting a degree of recovery that must be performed in case of hardening failure.

Referring to FIG. 2, while host 50 is described herein as executing a deterministic flushing of storage drive buffer 21 in accordance with the present invention, those having ordinary skill in the art will appreciate other components for supplementing host 50 or replacing host 50 in executing deterministic flushing of storage drive buffer 21 in accordance with the present invention (e.g., a storage control unit).

Referring to FIG. 3, the term "processor" as used herein is broadly defined as one or more processing units of any type for performing all arithmetic and logical operations and for decoding and executing all instructions related to facilitating an implementation by a storage control unit of the various methods of the present invention. Additionally, the term "memory" as used herein is broadly defined as encompassing all storage space in the form of computer readable mediums of any type within a storage control unit.

Furthermore, those having ordinary skill in the art of buffer flushing techniques may develop other embodiments of the present invention in view of the inventive principles of the present invention described herein. Thus, the terms and expression which have been employed in the foregoing specification are used herein as terms of description and not of limitations, and there is no intention in the use of such terms and expressions of excluding equivalents of the features shown and described or portions thereof, it being recognized that the scope of the present invention is defined and limited only by the claims which follow.

We claim:

1. A method, comprising:
    writing, by a host, a first storage data object corresponding to a first host data object to a storage data buffer included in a storage control unit;
    initiating, by the host, a processing of a second host data object, subsequent to the writing of the first storage data object;
    determining, by the host, whether a storage data flushing event has occurred, subsequent to the initiating of the processing of the second host data object;
    in response to determining that the storage data flushing event has not occurred, writing, by the host, a second storage data object corresponding to the second host data object to the storage data buffer included in the storage control unit; and in response to determining that the storage data flushing event has occurred performing:
    flushing, one or more storage data objects including the first storage data object from the storage data buffer to a storage medium included in a storage drive; and
    subsequent to the flushing of the one or more storage data objects including the first storage data object, writing, by the host, the second storage data object corresponding to the second host data object to the storage data buffer included in the storage control unit.

2. The method of claim 1, wherein determining whether the storage data flushing event has occurred further comprises:
    determining whether a storage data object quantity of the one or more storage data objects buffered within in the storage data buffer equals a storage data object quantity threshold of the storage data buffer.

3. The method of claim 2, wherein determining whether the storage data flushing event has occurred further comprises:
    determining whether a buffered byte quantity of the one or more storage data objects buffered within the storage data buffer exceeds a buffered byte quantity threshold of the storage data buffer.

4. The method of claim 3, wherein determining whether the storage data flushing event has occurred further comprises:
    determining an occurrence of a volume end event of the storage medium.

5. The method of claim 4, wherein determining whether the storage data flushing event has occurred further comprises:
    determining an occurrence of a data object processing error event.

6. The method of claim 5, wherein the storage data flushing event further comprises:
    determining an operational status of the host;
    determining an operational status of the storage drive;
    determining an operational status of the storage control unit; and
    determining an operational status of the storage medium.

7. The method of claim 1, further comprising:
    in response to writing the second storage data object corresponding to the second host data object to the storage data buffer, queuing a meta-data update of the second host data object; and
    in response to flushing the one or more storage data objects, initiating a processing of the queued meta data update.

8. A system, comprising:
    a processor; and
    a memory storing instructions operable with the processor, the instructions when executed by the processor causing operations, the operations comprising:
    writing, by a host, a first storage data object corresponding to a first host data object to a storage data buffer included in a storage control unit;
    initiating, by the host, a processing of a second host data object, subsequent to the writing of the first storage data object;
    determining, by the host, whether a storage data flushing event has occurred, subsequent to the initiating of the processing of the second host data object;
    in response to determining that the storage data flushing event has not occurred, writing, by the host, a second storage data object corresponding to the second host data object to the storage data buffer included in the storage control unit; and
    in response to determining that the storage data flushing event has occurred performing:
        flushing, one or more storage data objects including the first storage data object from the storage data buffer to a storage medium included in a storage drive; and
        subsequent to the flushing of the one or more storage data objects including the first storage data object, writing, by the host, the second storage data object corresponding to the second host data object to the storage data buffer included in the storage control unit.

9. The system of claim 8, wherein determining whether the storage data flushing event has occurred further comprises:
    determining whether a storage data object quantity of the one or more storage data objects buffered within in the storage data buffer equals a storage data object quantity threshold of the storage data buffer.

10. The system of claim 9, wherein determining whether the storage data flushing event has occurred further comprises:
    determining whether a buffered byte quantity of the one or more storage data objects buffered within the storage data buffer exceeds a buffered byte quantity threshold of the storage data buffer.

11. The system of claim 10, wherein determining whether the storage data flushing event has occurred further comprises:
    determining an occurrence of a volume end event of the storage medium.

12. The system of claim 11, wherein determining whether the storage data flushing event has occurred further comprises:
    determining an occurrence of a data object processing error event.

13. The system of claim 12, wherein the storage data flushing event further comprises:
    determining an operational status of the host;
    determining an operational status of the storage drive;
    determining an operational status of the storage control unit; and
    determining an operational status of the storage medium.

14. The system of claim 8, further comprising:
    in response to writing the second storage data object corresponding to the second host data object to the storage data buffer, queuing a meta-data update of the second host data object; and
    in response to flushing the one or more storage data objects, initiating a processing of the queued meta data update.

15. A computer readable medium tangibly embodying a program of machine-readable instructions executable by a processor to perform operations, the operations comprising:
    writing, by a host, a first storage data object corresponding to a first host data object to a storage data buffer included in a storage control unit;
    initiating, by the host, a processing of a second host data object, subsequent to the writing of the first storage data object;
    determining, by the host, whether a storage data flushing event has occurred, subsequent to the initiating of the processing of the second host data object;
    in response to determining that the storage data flushing event has not occurred, writing, by the host, a second storage data object corresponding to the second host data object to the storage data buffer included in the storage control unit; and
    in response to determining that the storage data flushing event has occurred performing:

flushing, one or more storage data objects including the first storage data object from the storage data buffer to a storage medium included in a storage drive; and subsequent to the flushing of the one or more storage data objects including the first storage data object, writing, by the host, the second storage data object corresponding to the second host data object to the storage data buffer included in the storage control unit.

16. The computer readable medium of claim 15, wherein determining whether the storage data flushing event has occurred further comprises:

determining whether a storage data object quantity of the one or more storage data objects buffered within in the storage data buffer equals a storage data object quantity threshold of the storage data buffer.

17. The computer readable medium of claim 16, wherein determining whether the storage data flushing event has occurred further comprises:

determining whether a buffered byte quantity of the one or more storage data objects buffered within the storage data buffer exceeds a buffered byte quantity threshold of the storage data buffer.

18. The computer readable medium of claim 17, wherein determining whether the storage data flushing event has occurred further comprises:

determining an occurrence of a volume end event of the storage medium.

19. The computer readable medium of claim 18, wherein determining whether the storage data flushing event has occurred further comprises:

determining an occurrence of a data object processing error event.

20. The computer readable medium of claim 19, wherein the storage data flushing event further comprises:

determining an operational status of the host;

determining an operational status of the storage drive;

determining an operational status of the storage control unit; and determining an operational status of the storage medium.

21. The computer readable medium of claim 15, further comprising:

in response to writing the second storage data object corresponding to the second host data object to the storage data buffer, queuing a meta-data update of the second host data object; and in response to flushing the one or more storage data objects, initiating a processing of the queued meta data update.

* * * * *